United States Patent [19]

Perkins

[11] Patent Number: 5,159,592
[45] Date of Patent: Oct. 27, 1992

[54] NETWORK ADDRESS MANAGEMENT FOR A WIRED NETWORK SUPPORTING WIRELESS COMMUNICATION TO A PLURALITY OF MOBILE USERS

[75] Inventor: Charles E. Perkins, Peekskill, N.Y.

[73] Assignee: International Business Machines Corporation, Armonk, N.Y.

[21] Appl. No.: 605,592

[22] Filed: Oct. 29, 1990

[51] Int. Cl.$^5$ .......................... H04J 3/24; H04B 7/00
[52] U.S. Cl. .................................. 370/85.7; 370/85.13; 370/94.1; 370/95.1
[58] Field of Search ...................... 370/60, 85.1, 85.2, 370/85.3, 85.7, 85.13, 94.1, 94.3, 95.1; 340/825.5, 825.51; 455/39, 68, 53.1, 54.1, 54.2, 55.1, 56.1

[56] References Cited

U.S. PATENT DOCUMENTS

| | | | |
|---|---|---|---|
| 4,644,461 | 2/1987 | Jennings | 364/200 |
| 4,665,519 | 5/1987 | Kirchner et al. | 370/94.1 |
| 4,706,081 | 11/1987 | Hart et al. | 340/825.03 |
| 4,750,109 | 6/1988 | Kita | 364/200 |
| 4,807,222 | 2/1989 | Amitay | 370/85.12 |
| 4,809,257 | 2/1989 | Gantenbein et al. | 370/4 |
| 4,893,307 | 1/1990 | McKay et al. | 370/94.1 |
| 4,914,652 | 4/1990 | Nguyen | 370/85.5 |
| 5,014,345 | 5/1991 | Comroe et al. | 455/54 |
| 5,029,183 | 7/1991 | Tymes | 375/1 |
| 5,040,175 | 8/1991 | Tuch et al. | 370/94.1 |
| 5,068,916 | 11/1991 | Harrison et al. | 455/39 |

FOREIGN PATENT DOCUMENTS

| | | |
|---|---|---|
| 0182417 | 5/1986 | European Pat. Off. |
| 0328100 | 8/1989 | European Pat. Off. |
| WO88/07794 | 10/1988 | PCT Int'l Appl. |

OTHER PUBLICATIONS

IEEE Transactions On Communications, vol. 38, No. 8, Aug. 1990, New York, pp. 1272-1280; D. J. Goodwin: "Cellular Packet Communications".

10th Conference On Local Computer Networks, Oct. 1985, New York, US pp. 149–157 W. M. Loucks et al.: "Implementation Of A Dynamic Address Assignment Protocol In A Local Area Network".

Data Communications, vol. 16, No. 12, Nov. 1987, New York US, pp. 209-225; D. Retz: "TCP/IP: DOD suite marches into the business world".

"Internet Protocol DARPA Internet Program Protocol Specification", Sep. 1981, Information Sciences Institute, University of Southern CA, Marina del Rey, Calif. 90291.

"Infrared Microbroadcasting Network For In-House Data Communication", F. Gfeller, *IBM Technical Disclosure Bulletin*, vol. 24, No. 8, Jan. 1982.

Primary Examiner—Douglas W. Olms
Assistant Examiner—Alpus H. Hsu
Attorney, Agent, or Firm—Perman & Green

[57] ABSTRACT

Apparatus and method for managing bidirectional transmission of information between a wired network and at least one mobile communication unit (10) in wireless communication with the wired network. The wired network is of the type wherein users of the network are each assigned a unique network address such as in, for example, a TCP/IP network. In accordance with the invention there is provided a local gateway (16) coupled between a wireless LAN and the wired network for communication with a mobile communication unit. There is also provided a global gateway (18) coupled to the local gateway and to remote users of the network. The global gateway functions to maintain a plurality of network addresses and, in response to a request for an assignment of a network address from the mobile communication unit, assigns one of the plurality of network addresses to the requesting mobile communication unit. The global gateway also buffers and routes data received from a remote user, the data being directed to an addresss corresponding to the assigned network address, to the mobile communication unit having the assigned address.

20 Claims, 5 Drawing Sheets

NETWORK ADDRESS MANAGEMENT FOR A WIRED NETWORK SUPPORTING WIRELESS COMMUNICATION TO A PLURALITY OF MOBILE USERS

FIELD OF THE INVENTION

This invention relates generally to communication method and apparatus and, in particular, to method and apparatus for managing network address assignments in a network that includes mobile users.

BACKGROUND OF THE INVENTION

Commonly assigned U.S. Pat. No. 4,893,307, issued Jan. 9, 1990, "Method and Apparatus for Linking SNA Terminals to an SNA Host Over a Packet Switched Communications Network", D. B. McKay, R. M. Morten and M. P. Marsili, describes an architectural model of the Department of Defense (DoD) protocol suite. Referring to FIG. 1 the architecture is said to be similar to, but not identical with, the International Standards Organization (ISO) Open Systems Interconnection (OSI) architecture.

A Defense Data Network (DDN) standard establishes criteria for an Internet Protocol (IP) which supports the interconnection of communication LANs. It introduces the Internet Protocol's role and purpose, defines the services provided to users, and specifies the mechanisms needed to support those services. The standard also defines the services required of the lower protocol layer, describes the upper and lower interfaces, and outlines the execution environment services need for implementation.

A Transmission Control Protocol (TCP) is a transport protocol providing connection-oriented, end-to-end reliable data transmission in packet-switched computer LANs and internetworks.

The Internet Protocol (IP) and the Transmission Control Protocol (TCP) are mandatory for use in all DoD packet switching networks which connect or have the potential for utilizing connectivity across network or subnetwork boundaries. Network elements, such as hosts, front-ends, gateways, etc., within such networks which are to be used for internetting must implement TCP/IP.

The Internet Protocol is designed to interconnect packet-switched communication LANs to form an internetwork. The IP transmits blocks of data, called internet datagrams, from sources to destinations throughout the internet. Sources and destinations are hosts located on either the same subnetwork or connected LANs. The IP is purposely limited in scope to provide the basic functions necessary to deliver a block of data. Each internet datagram is an independent entity unrelated to any other internet datagrams. The IP does not create connections or logical circuits and has no mechanisms to promote data reliability, flow control, sequencing, or other services commonly found in virtual circuit protocols.

The DDN standard specifies a host IP. As defined in the DoD architectural mode, the Internet Protocol resides in the internetwork layer. Thus, the IP provides services to transport layer protocols and relies on the services of the lower network protocol. In each gateway, a system interconnecting two or more LANs, an IP resides above two or more LANs protocol entities. Gateways implement the internet protocol to forward datagrams between networks. Gateways also implement the Gateway to Gateway Protocol (GGP) to coordinate signalling and other internet control information.

The Internet protocols were originally developed with an assumption that users, each of which is assigned a unique Internet address, would be connected to the network at fixed locations. However, for portable and handheld computers the movement, or migration, of users about the network is typically the rule rather than the exception. As a result, a problem is created in that the implicit design assumptions of the Internet protocol are violated by this type of usage.

Other patents of interest include the following. In U.S Pat. No. 4,914,652, issued Apr. 3, 1990, Nguyen discloses a method for managing data transmissions in a single network, but not the routing and delivery of data between networks. In U.S. Pat. No. 4,750,109, issued Jun. 7, 1988, Kits teaches methods for allocating communication channels. In U.S. Pat. No. 4,706,081, issued Nov. 10, 1987, Hart et al. teach the merging of physically separate networks into a single logical network at a level below the addressing considerations required to affect the Internet protocols. In U.S. Pat. No. 4,644,461, issued Feb. 17, 1987, Jennings discloses a computer architecture including cross-bar and queue structures for routing tokens within the computer.

In commonly assigned U.S. Pat. No. 4,809,257, issued Feb. 28, 1989, entitled "Hierarchical Distributed Infrared Communication System" Gantenbein et al. disclose the integration of workstations into an IR network. FIG. 1D shows a system that includes a gateway 23 to another network such as a ring or a bus local area network, or to a cable-bound subnetwork.

Other patents of interest include the following. In U.S. Pat. No. 4,807,222, issued Feb. 21, 1989, N. Amitay discloses a wireless network using intelligent interfaces for each wired network connection. The interface is to a token bus network.

In U.S. Pat. No. 4,665,519, issued May 12, 1987, T. L. Kirchner et al. disclose the use of VHF FM radio as a means of connecting computers and computer peripherals. This patent describes the implementation of an asynchronous access, token based protocol. In International Patent WO88/07794, published Oct. 6, 1988, G. Vacon discloses the use of a wireless microwave bridge between two networks utilizing a CSMA/CD protocol.

In IBM Technical Disclosure Bulletin Vol. 24 No. 8, 1982 F. Gfeller describes general control principles of an infrared wireless communication network incorporating multiple base stations and multiple mobile computers. Transmission occurs over the wireless IR medium using different frequencies for the uplink and the downlink.

What is not taught by this prior art, and what is thus an object of the invention to provide, is method and apparatus for coupling wireless migrating users to a network operating in accordance with the TCP/IP type-protocol.

SUMMARY OF THE INVENTION

The foregoing problems are overcome and other advantages are realized by method and apparatus that manages mobile communication unit address assignments and which assumes responsibility for the routing of all packets destined for the mobile units. Additionally, a local mobile unit gateway service is provided on every network or LAN in order to route packets to the mobile units coupled to the network. In accordance with the invention a network address, such as an Internet address, that is associated with a particular mobile unit encodes a network not physically embodied anywhere, referred to herein as a 'pseudo-network'. Routers of data packets are instructed to forward packets, destined for the designated network, to the global gateway. The global gateway subsequently executes methods, described in detail, to accomplish the packet transmission to the target mobile unit. The Internet addresses for each mobile unit are allocated and deallocated from a pool of addresses available for the pseudo-network. A 'permanent' assignment of a pseudo-address to a mobile unit is also within the scope of operation of the global gateway.

That is, the invention relates to apparatus and method for managing bidirectional transmission of information between a wired network and at least one mobile communication unit in wireless communication with the wired network. The wired network is of the type wherein users of the network are each assigned a unique network address such as in, for example, a TCP/IP network. In accordance with the invention there is provided a local gateway coupled between a wireless network and the wired network for communicating with a mobile communication unit. There is also provided a global gateway coupled to the local gateway and to remote users of the network. The global gateway functions to maintain a plurality of network addresses and, in response to a request for an assignment of a network address from the mobile communication unit, assigns one of the plurality of network addresses to the requesting mobile communication unit. The global gateway also buffers and routes data received from a remote user to the mobile communication unit having the assigned address, the data being directed to an address corresponding to the assigned network address.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
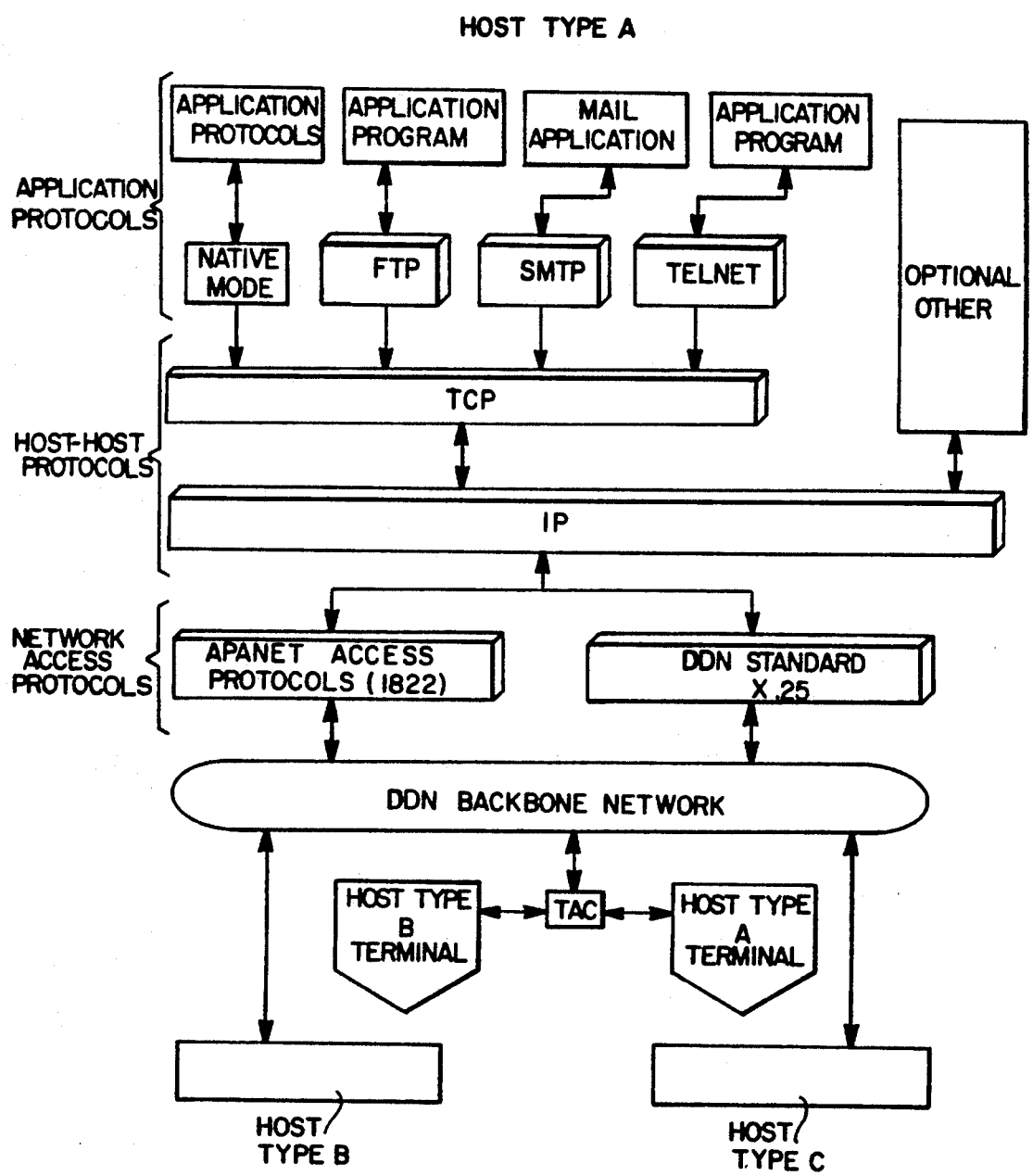
FIG. 1 is a prior art architectural diagram of the Defense Data Network.
Figure 2:
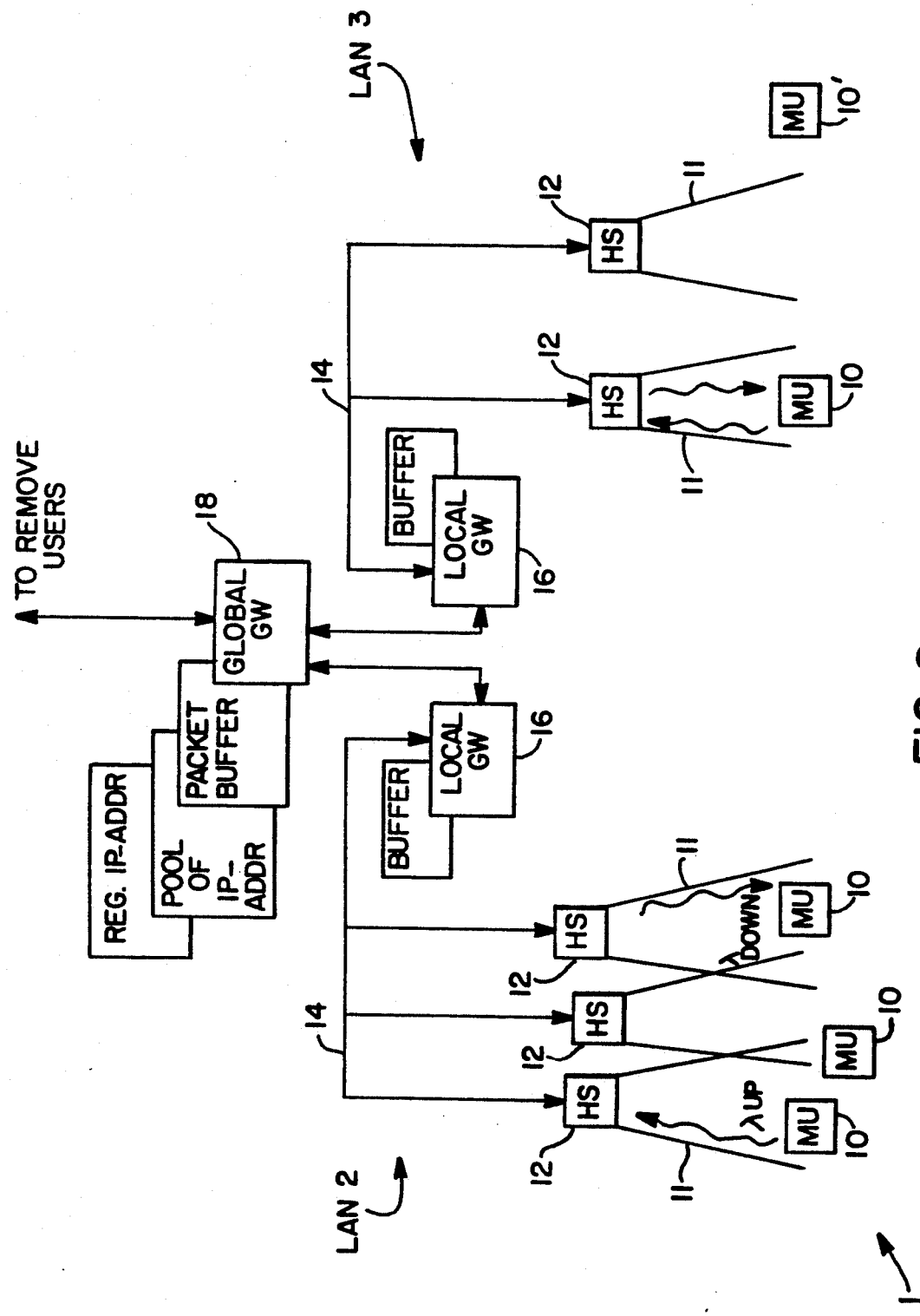
FIG. 2 is a block diagram showing a global gateway coupled to a plurality of local gateways each of which may reside on a separate wired/wireless LAN.

Referring to FIG. 2 there is illustrated a communications area network 1. The network 1 includes one or more local area networks (LANs) 2 and 3. Each LAN includes a wireless network comprised of a plurality of mobile communication units (MU) 10 in wireless communication with a plurality of header stations (HS) 12. Each of the header stations 12 is bidirectionally coupled to a wired LAN 14. In the presently preferred embodiment of the invention the wireless medium is comprised of infrared (IR) radiation, although other embodiments may employ an RF wireless medium. Each of the header stations 12 has associated therewith a communications coverage area, or cell 11.

Communication between mobile units 10 is through the header stations 12 via the LAN 14. Communication between the header stations 12 is primarily via the LAN 14.

One suitable embodiment for the header stations 12 and the mobile units 10 is disclosed in commonly assigned U.S. patent application Ser. No. 07/605,052, filed Oct. 29, 1990, entitled "Transceiver for Extending a CSMA/CD Network for Wireless Communication" by P. Hortensius and H. Winbom.

The network 10 conforms, in the presently preferred embodiment of the invention, to a network protocol known as the Transport Control Protocol/Internet Protocol (TCP/IP), as described in detail in "Internetworking with TCP/IP Principles, Protocols, and Architectures" by Douglas E. Comer, Prentice Hall, N.J., 1988. The teaching of the invention should, however, not be construed to be limited to only such a network protocol, but may be employed with any protocol that encodes a LAN identification into a network address.

In accordance with an aspect of the invention each of the LANs 2 and 3 includes at least one local gateway (GW) 16 for coupling the mobile units 10, via the header stations 12 and the LAN 14, to a global gateway 18. The global gateway 18 is also coupled to remote network users who may be dispersed over a wide geographic area. The local gateways 16 may each be an "intelligent" header station or may be a separate dedicated network entity as shown. The global gateway 18 is preferably a data processor having suitable network adapters and an archival facility for storing packets addressed to particular ones of the mobile units 10 during a time when the mobile units are not in contact with the wireless network. The data processor that comprises the global gateway 18 includes means for assigning, maintaining and associating "pseudo-IP" addresses with particular ones of the mobile units 10, in a manner to be described.

An IP address consists of four bytes, or 32 bits, that are partitioned into a LAN identification and a Host identification. By example, an IP address may have the form 123.45.67.12. The first two bytes encode a LAN address of 123 (byte 1) and 45 (byte 2). The remaining two bytes generally encode Host information. There is a different Host associated with each LAN. Thus, in the example provided Host (12) may have up to 256 IP addresses associated therewith, as encoded in the third byte.

In accordance with IP practice each user of the network is assigned a unique network address. A problem solved by the invention relates to the assignment of IP addresses to the mobile units 10 which, inherently, do not maintain a fixed connection relationship with the network. This problem is solved, as described below, by allocating a plurality of IP addresses to the global gateway 18. These allocated IP addresses are subsequently dynamically assigned by the global gateway 18 to requesting mobile units 10, either on a temporary basis (one network session) or on a permanent, extended, basis (several network sessions). At the termination of a session or sessions the IP address is returned to the global gateway 18 for subsequent reassignment to the same or another mobile unit 10. These assigned IP addresses are referred to herein as pseudo-IP addresses and represent a dynamic pseudo-network.

In accordance with the invention a network address, such as an Internet address that is associated with a particular mobile unit 10 encodes a network not physically embodied anywhere and which is referred to herein as the pseudo-network. In accordance with an aspect of the invention the global gateway 18 "owns" all of associated pseudo-IP addresses and allocates and deallocates the pseudo-IP addresses as the mobile units 10 enter and leave the LANs 2 and 3. A mobile unit 10 typically maintains its assigned pseudo-IP address until it is turned off, or until the network session is actively terminated. Upon specific request by a particular one of the mobile units 10 a 'permanent' association is made between a mobile unit 10 and one of the pseudo-IP addresses. This permanent assignment is preferably not permanent in the sense that the mobile unit 10 would own the address for all time, in that the available pool of pseudo-IP addresses could quickly be consumed. Preferably, the permanent assignment is only sufficiently long so as to accomplish a specific task which may require a plurality of separate network sessions. The global gateway 18 is responsible for maintaining the permanent pseudo-IP association, even though a local gateway 16 may also maintain the relationship for so long as the mobile unit 10 stays in contact with the local gateway 16. The global gateway 18 also buffers any packets destined for a particular mobile unit 10 during any time that the mobile unit 10 is out of touch with the network, such as the mobile unit 10' which is not located within one of the communication cells 11.

A function of the local gateway 16 is to deliver data packets, via the wireless downlink, to known mobile units 10 within its associated cell 11. If a mobile unit 10 is out of touch with the wireless network no other local gateway 16 participates in the transmission of packets destined for that mobile unit 10.

Being out of touch for a predetermined period of time causes the mobile unit's local gateway 16 to notify the global gateway 18, via LAN 14, that the mobile unit 10 is no longer a member of the group of mobile units associated with the local gateway 16. In response to being notified of the disappearance of the mobile unit 10 the global gateway 18 terminates the forwarding of packets, through the local gateway 16, that are directed to the inactive mobile unit.

The following communication operations are now described in detail: (a) initialization of a mobile unit 10 and the initialization of network routing for the mobile unit 10; (b) resumption of service to a mobile unit 10; (c) termination of service to a mobile unit 10; (d) delivery of packets to a mobile unit 10; and (e) transmission of packets from a mobile unit 10.

Figure 3:
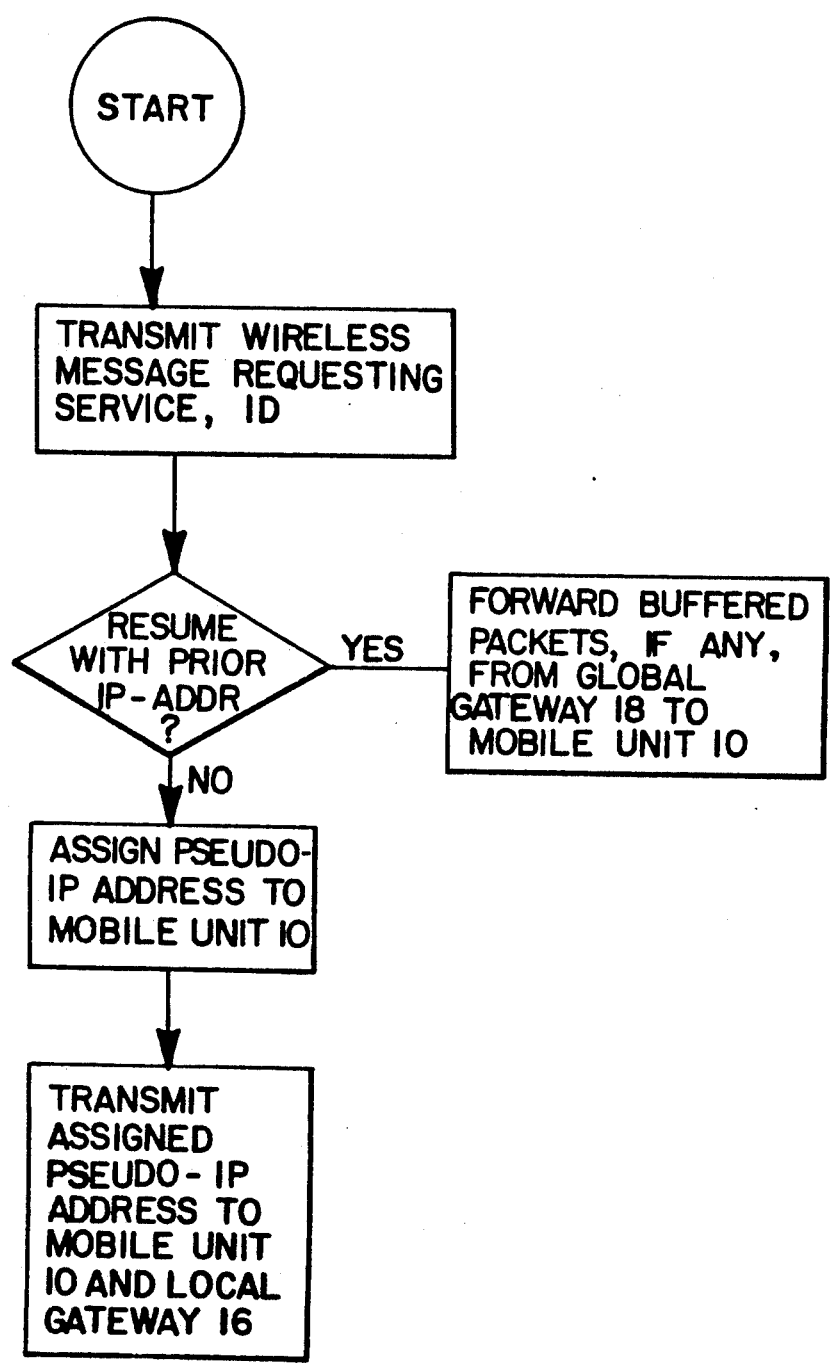
FIGS. 3-6 are each a flowchart depicting various interactions between mobile units, a global gateway, a local gateway and remote users.

Initialization (FIG. 3)

When a mobile unit 10 first enters a LAN cell 11 it performs the following operations. The newly arrived mobile unit 10 first directs a message, via a header station 12, to the local gateway 16. This message requests the local gateway 16, through the global gateway 18, to activate a pseudo-IP address for the mobile unit 10. The mobile unit 10 identifies itself by transmitting a unique identifier, such as its serial number, that is permanently stored within a memory of the mobile unit 10. The requested pseudo-IP address may be either a pseudo-IP address that is permanently assigned to that mobile unit 10, or a dynamically allocated pseudo-IP address that the global gateway 18 selects from a pool of such addresses.

The local gateway 16 determines from the mobile unit's request that the mobile unit 10 does not expect to resume service from any previous sessions. Otherwise, the local gateway 16 instead begins to relay packets from those sessions, the packets being stored and forwarded by the global gateway 18. Likewise, when the global gateway 18 receives the request, it compares the incoming mobile unit 10 identifier, or serial number, with a list of serial numbers to purge any stored packets that might have been saved for the mobile unit 10.

If the global gateway 18 returns to the newly activated mobile unit 10 a permanently registered pseudo-IP address, the global gateway 18 may also begin forwarding messages and other stored data to that mobile unit 10, through the local gateway 16. This data is originally received from the network during a period that the mobile unit 10 associated with the permanently registered pseudo-IP address is inactive. This received data is buffered by the global gateway 18 during this period for subsequent delivery to the mobile unit 10 when the mobile unit 10 once more becomes active.

Figure 4:
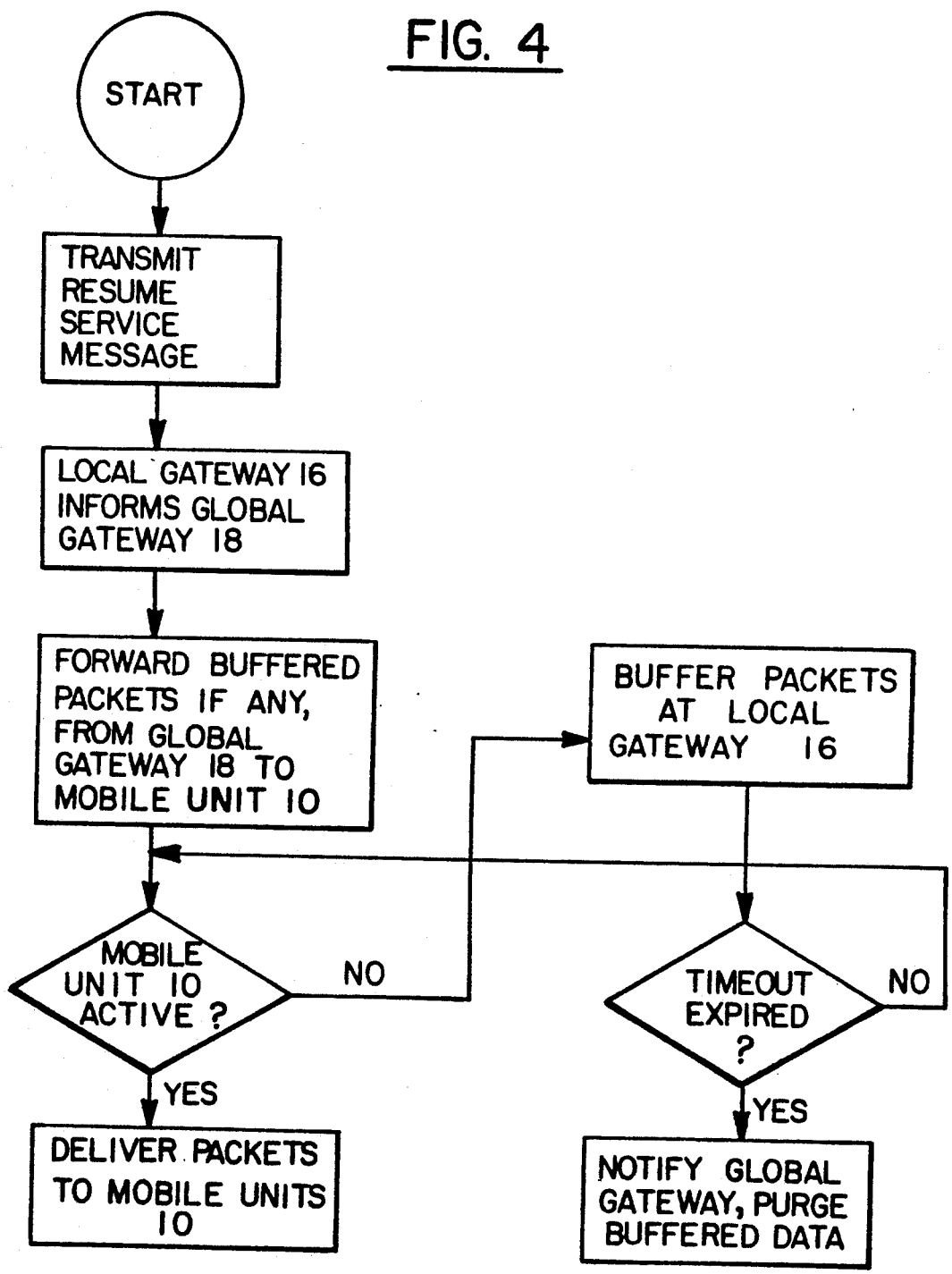

Resumption of Service (FIG. 4)

When a mobile unit 10 enters a cell 11 and indicates that it is to continue a previous network connection, it sends a message to the local gateway 16, via a header station 12. The message causes the local gateway 16 to notify the global gateway 18, and possibly a previous local gateway 16, that the mobile unit 10 has migrated to the new cell 11. The local gateway 16 requests from the global gateway 18 all packets currently queued for the mobile unit 10 pseudo-IP address and delivers the packets over the downlink wireless channel. The global gateway 18 thereafter forwards to the local gateway 16 all future packets addressed to the pseudo-IP address associated, either temporarily or permanently, with the mobile unit 10. Any remote users having knowledge of the pseudo-IP address may negotiate an optimal route to the local gateway 16, employing known IP protocols. In this regard the local gateway 16 assumes responsibility for breaking the route if and when the mobile unit 10 migrates out of the local gateway's 16 cell area.

To avoid an unstable situation that may arise if the local gateway 16 purged internal data structures of all knowledge of a mobile unit 10 as soon as the mobile unit 10 was determined to be out of touch, such as might arise if a particular mobile unit 10 wandered along the periphery of a cell 11; the local gateway 16 temporarily queues packets destined for the mobile units 10 within the local gateway's service area (or LAN). If the mobile unit 10 returns to the local gateway's service area before the queuing time limit expires the local gateway 16 delivers the queued packets to the mobile unit 10. As such, so long as the mobile unit 10 returns to the service area within a predetermined time interval the local gateway is not required to notify the global gateway 18 that the local gateway 16 has relinquished responsibility for the mobile unit 10.

Figure 5:
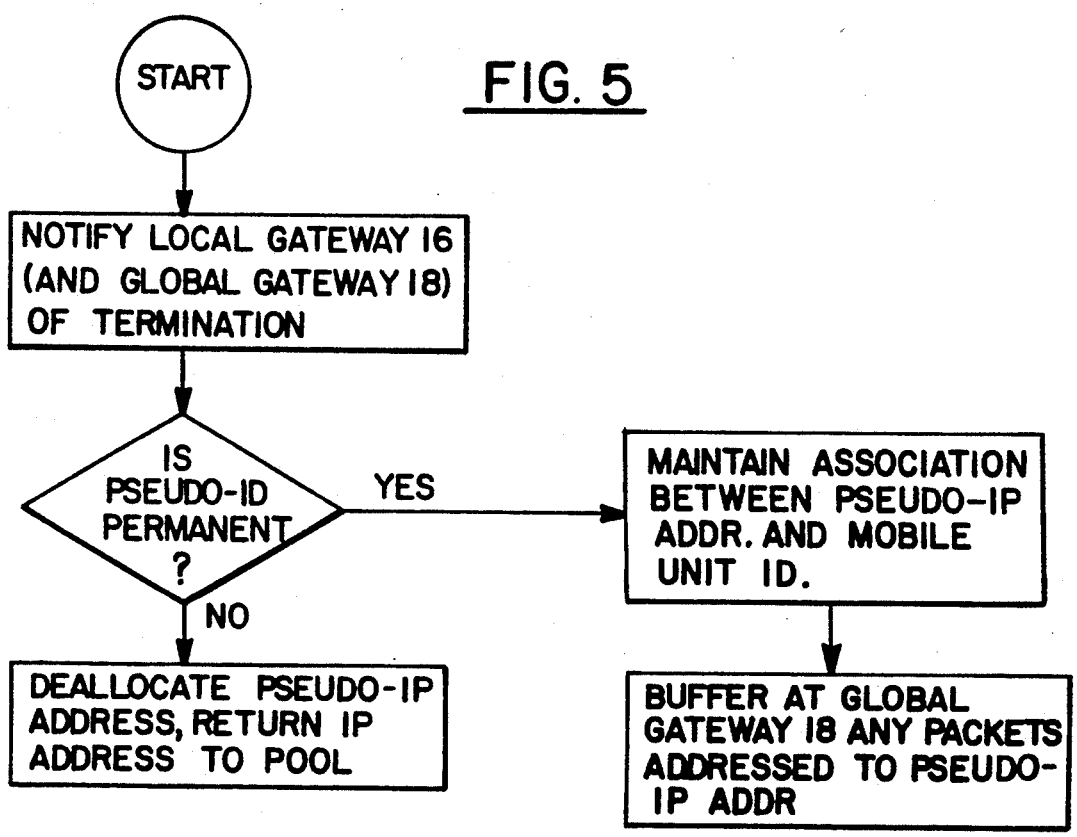

Termination of Service (FIG. 5)

If a mobile unit 10 intends to terminate incoming network service in an orderly manner it notifies the local gateway 16 via a header station 12. The local gateway 16 notifies the global gateway 18 that the mobile unit's pseudo-IP address may be deallocated. The global gateway 18 also purges all stored information relating to the mobile unit 10. The global gateway 18 does not purge the association between the pseudo-IP address and the particular mobile unit 10 if the mobile unit 10 has previously requested and received a permanently associated pseudo-IP address.

Figure 6:
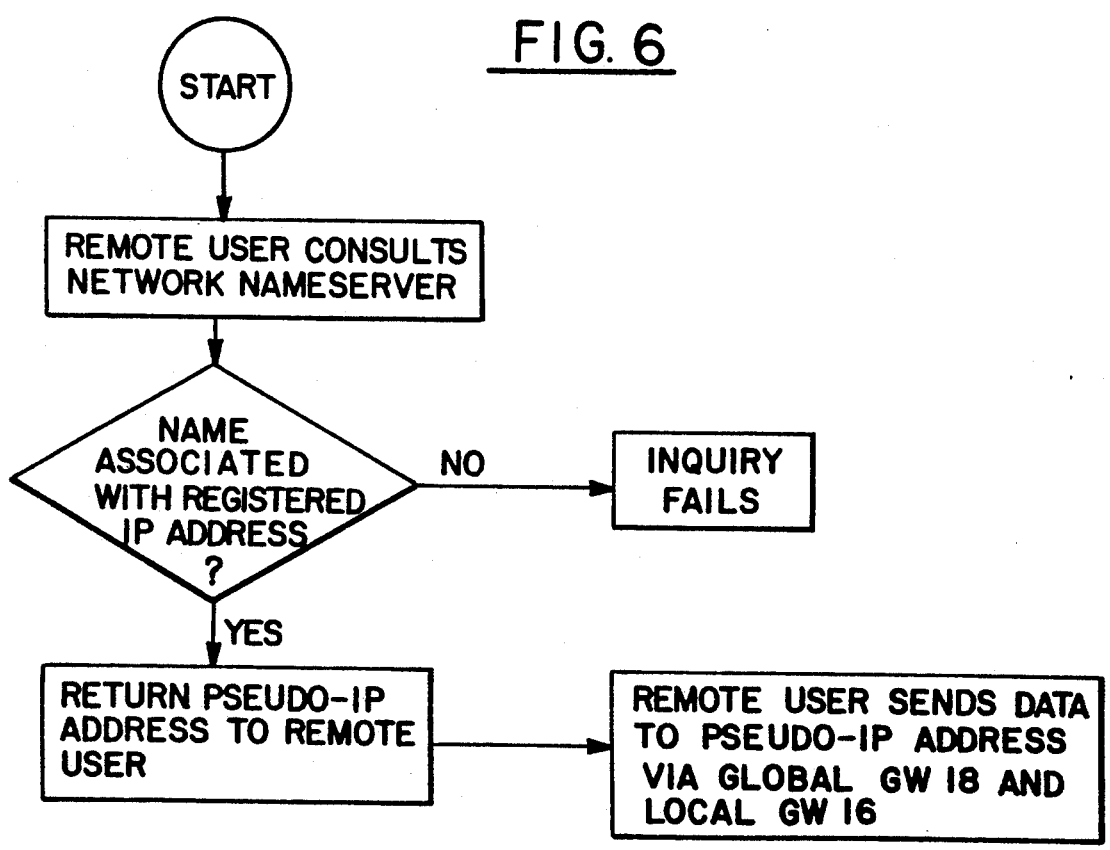

Delivery of Packets to a Mobile Unit 10 (FIG. 6)

All communication from a remote user to a mobile unit 10 employs the pseudo-IP address of the mobile unit 10. Fully qualified mobile unit 10 names specify a domain for use with network nameservers. By example, a mobile unit 10 having an associated name of "C__E__Perkins" may be located within a domain designated "hawII.np.watson.ibm.com" and thus have the fully qualified name "C__E__Perkins.hawII.np.watson.ibm.com". When a remote user initiates a conversation with a mobile unit 10 the remote user typically consults a network nameserver configured to send requests for specified mobile unit 10 names to a specified mobile unit 10 global gateway 18. A request for a mobile unit 10 name fails unless there exists an association registered between the mobile unit 10 name and a particular pseudo-IP address.

Nameserver operation is now described in greater detail. If the requested name is associated to a permanently assigned address, that address is returned by the nameserver even though the associated mobile unit 10 is turned off. If the requested name is temporarily registered to a pseudo-IP address, that address is returned. However, if the name is associated with a previously known pseudo-IP address, a predetermined special IP address is returned. The special pseudo-IP address is reserved only for this use and is not otherwise ever assigned to any mobile unit 10. This reserved address is specially handled by the global gateway 18 if it is used by remote hosts for incoming mail requests Using the example given previously the returned IP address may correspond to 123.45.199.12, where 199 corresponds to the reserved address.

If a remote user obtains the pseudo-IP address of a registered mobile unit 10, the remote user is enabled to send messages, such as mail, to the mobile unit 10, even if the mobile unit 10 is inactive. In this case the message packets are stored, as previously described, by the global gateway 18 until such time as the mobile unit 10 is active and the packets can be delivered via an associated local gateway 16. TCP session requests for the mobile unit 10 from the remote user are denied by the global gateway 18 unless the mobile unit 10 is active, although the session request may be accepted by the global gateway 18 when the mobile unit is active but merely temporarily "out of touch". However, only permanently situated mobile units 10 having a registered, permanent IP address may rely on conventional IP methods for point-to-point network communications.

A mobile unit 10 delivering a packet to a remote user employs conventional methods of network transmission and uses the IP address of the remote user. A remote user, running software having no provisions for mobile unit 10 communications, transmits a packet to a mobile unit 10 by routing the packet to the global gateway 18, which then relays the packet to the local gateway 16 that is managing mobile unit 10 network traffic for an associated subset of mobile units 10. This operation proceeds using a non-IP protocol; however, transmission of the packets associated with the nonstandard protocol, between the gateways 18 and 16, is accomplished by conventional IP methods.

In this regard packets bearing the IP address are routed to the global gateway 18 which encapsulates them as data within new IP packets destined for the local gateway 16. The local gateway 16, which may be one of the header stations 12, accomplishes further transmission of the data to the target mobile unit by using a non-Internet protocol. That is, by whatever protocol is established for the wireless network communication. Any packet transmitted to a pseudo-IP address using IP would be routed to the global gateway 18, thus negating the use of the pseudo-IP address. Indeed, the problem solved by the use of the invention is that of encoding the logical network number inside the IP address when the logical network number is associated with a mobile data communication entity.

If instead a remote user is executing software to enable special handling of pseudo-IP addresses, the remote user is enabled to deliver the mobile unit 10 packets directly to the mobile unit's local gateway 16, without requiring the intervention of the global gateway 18. This mode of operation requires the local gateway 16 to inform the remote user before the local gateway 16 terminates service for the mobile unit 10, as in the case when the mobile unit becomes inactive or migrates out of the cells 11 served by the local gateway 16.

In either situation described above the remote user is required to send mobile unit 10 data packets to the global gateway 18 for storage while the mobile unit 10 is inactive.

Transmission from a Mobile Unit 10 to a Remote User

Transmission of packets from a mobile unit 10 to a remote user is accomplished using conventional IP addressing techniques. However, if the remote computer is known to be able to operate with multiplexed pseudo-IP address assignments, as described below, the mobile unit 10 encapsulates outgoing data within a header within the TCP packet to ensure that the remote user becomes aware of which specific mobile unit 10 is the source of the data.

Having described the five communication operations listed above other aspects of the invention are now described, specifically multiple interactive global gateways and multiplexed, or shared, pseudo-IP addresses.

Multiple Interactive Global Gateways

A single global gateway 18 may become a bottleneck if it is simultaneously managing many separate Internetwork mobile unit 10 sessions. This is unlikely, however, unless there are many remote users having no special knowledge of the special nature of the pseudo-IP address, but which nevertheless maintain active communications with the mobile units 10. To eliminate this potential bottleneck several global gateways 18 are employed to partition the set of all mobile units 10 into disjoint subsets. This may be accomplished in either of two ways. A first method employs different "pseudo-network" numbers, one per global gateway 18. Alternatively, each global gateway 18 maintains and shares with its peers a consistent set of tables describing the current routing information, or location, for each mobile unit 10. If each global gateway 18 has separate pseudo-networks, then IP routing will automatically send IP packets to the correct global gateway 18 that is primarily responsible for a mobile unit. Even so, the global gateways 18 must cooperate with one another if free movement and access to the same set of remote hosts is to be accomplished.

Multiplexed pseudo-IP Addresses

As a community of mobile units 10 develops the required pseudo-IP addresses may be in short supply. If sessions with remote users having no special knowledge of the pseudo-IP addressing are frequently required a less than optimum solution is to continue to allocate more and more IP addresses. However, the remote users can be provided with facilities specifically directed to the needs of mobile unit 10 communications. Thus, software may be employed that uses a same pseudo-IP address to designate an arbitrarily large number of mobile units 10. Differentiation between mobile units 10 sharing a common pseudo-IP address is accomplished by including their respective unique identifiers, such as their serial numbers, within each IP packet.

This additional functionality of the remote users preferably resides in a layer above the TCP protocol handling. One suitable level is in the operating system. This added functionality demultiplexes the session stream according to an additional header, containing the mobile unit's serial number, into ports opened by the processes run by the remote user. Packets sent from the remote user to a particular mobile unit 10 are directed to the local gateway 16 that is responsible, at that particular time, for the desired mobile unit 10.

While the invention has been particularly shown and described with respect to a preferred embodiment thereof, it will be understood by those skilled in the art that changes in form and details may be made therein without departing from the scope and spirit of the invention.

Having thus described my invention, what I claim as new, and desire to secure by Letters Patent, is:

1. A method for transmitting information in a network that includes a wireless network and a wired network, the network having at least one mobile communication unit in wireless communication with the wired network over the wireless network, the network being characterized in that users of the network are each assigned a unique network address, comprising the steps of:
   establishing, through the wireless network, communication between the wired network and a mobile communication unit;
   requesting an assignment of a network address for the mobile communication unit, the request being made to a network gateway by the mobile communication unit through the wireless network, the network gateway being bidirectionally coupled to the wired network for providing communications to remote users of the network;
   in response to the request, assigning, with the network gateway, a network address to the mobile communication unit, the assigned address being transmitted from the network gateway to the wired network;
   receiving the assigned network address with the mobile communication unit, the assigned address being received through the wireless network; and
   in response to the received network address, the mobile communication unit thereafter communicating with the network by employing the assigned network address.

2. A method as set forth in claim 1 wherein the steps of establishing, requesting, transmitting, and receiving each include a step of routing information between the wireless network and the wired network through a local gateway, the local gateway being coupled between the wireless network and, through the wired network, to the network gateway.

3. A method as set forth in claim 2, wherein, in response to the mobile communication unit becoming uncoupled from the wireless network, the method further includes the steps of:
   notifying the network gateway that the mobile communication unit is no longer active, the step of notifying including a step of sending a message from the local gateway over the wired network to the network gateway; and
   in response to the notification by the local gateway, deassigning, at the network gateway, the assigned network address.

4. A method as set forth in claim 3 wherein the step of notifying includes an initial step of buffering within the local gateway, for a predetermined interval of time, any information received from the wired network that is addressed to the mobile communication unit that is no longer active, and wherein, if the mobile communication unit again becomes coupled to the wireless network before the expiration of the predetermined interval of time, the local gateway does not execute the step of notifying.

5. A method as set forth in claim 1 and further including a step of buffering, at the network gateway, packets of data addressed to the assigned network address during a time that the mobile communication unit is not actively coupled to the wireless network.

6. A method as set forth in claim 5 wherein in response to the mobile communication unit indicating that it is once more actively coupled to the wireless network, further including the steps of:
   retrieving the buffered packets of data;
   forwarding the retrieved packets to a local gateway that is bidirectionally coupled between the wired network and the wireless network; and
   transmitting the retrieved packets from the local gateway to the mobile communication unit over the wireless network.

7. A method as set forth in claim 1 wherein the step of assigning includes a step of allocating the assigned network address from a pool of network addresses that is maintained by the network gateway.

8. A method as set forth in claim 7 wherein the wired network conforms to a Transmission Control Protocol/Internet Protocol standard and wherein the step of allocating includes an initial step of reserving a plurality of Internet Protocol addresses for use by the network gateway.

9. A method as set forth in claim 1 wherein the step of requesting includes a step of transmitting, from the mobile communication unit to the network gateway, an identifier that is unique to the mobile communication unit.

10. A method as set forth in claim 9 wherein the step of assigning assigns a single network address to a plurality of mobile communication units, the assigned network address including, for each of the plurality of mobile communication units, the respective one of the unique identifiers so as to differentiate the plurality of mobile communication units one from another.

11. A method as set forth in claim 1 and, in response to a message from the mobile communication unit that the mobile communication unit intends to terminate communication with the wired network, the method includes a further step of deassigning the assigned network address at the network gateway.

12. A method as set forth in claim 1 and, in response to a name inquiry to determine a network address that is associated with a name, further including the steps of:
if the name is associated with a permanently assigned network address, returning the permanently assigned network address in response to the inquiry;
if the name is associated with a temporarily assigned network address, returning the temporarily assigned network address in response to the inquiry; and
if the name is associated with a previously assigned network address, returning a predetermined network address that differs from the previously assigned network address.

13. In a data communications network comprised of a wired network and a wireless network, apparatus for managing the bidirectional transmission of information between the wired network and at least one mobile communication unit in wireless communications with the wired network over the wireless network, the data communications network being characterized in that users of the data communications network are each assigned a unique network address, comprising:
local gateway means, coupled between a wireless Local Area Network (LAN) and the wired network, for communicating with a mobile communication unit; and
global gateway means coupled to the local gateway means and to remote users of the data communications network, the global gateway means including means for maintaining a plurality of network addresses, means for receiving a request for an assignment of a network address from the mobile communication unit, means for assigning one of the plurality of network addresses to the requesting mobile communication unit; and means for routing data received from a remote user, the data having an address corresponding to the assigned network address, to the mobile communication unit having the assigned address.

14. Apparatus as set forth in claim 13 wherein the global gateway means further includes means for buffering data received from a remote user, the received data being addressed to a mobile communication unit having one of the assigned network addresses.

15. Apparatus as set forth in claim 13 wherein the data communications network includes a plurality of wireless LANs each of which has at least one local gateway means coupled thereto.

16. Apparatus as set forth in claim 15 and further comprising a plurality of global gateway means individual ones of which are coupled to different ones of the plurality of wireless LANs through at least one of said local gateway means, each of said plurality of global gateway means including means for assigning network addresses to mobile communication units in wireless communication with their respective wireless LANs.

17. Apparatus as set forth in claim 13 wherein the network addresses correspond to Internet Protocol address.

18. Apparatus as set forth in claim 13 wherein the local gateway means includes means for buffering data addressed to one or more mobile communication units that are coupled to the wireless LAN.

19. In a data communications network comprised of a wired network and a wireless network, a method for managing the bidirectional transmission of information between the wired network and at least one mobile communication unit in wireless communication with the wired network over the wireless network, the data communications network being characterized in that users of the data communications network are each assigned a unique network address, comprising the steps of:
maintaining a plurality of the unique network addresses with a global gateway means, the global gateway means being bidirectionally coupled to a local gateway means, through the wired network, and also to remote users of the data communications network, the local gateway means being coupled between the wireless and the wired network;
receiving, at the global gateway means, a request for an assignment of the network address from a mobile communication unit;
in response to the received request, assigning one of the plurality of network addresses to the requesting mobile communication unit; and
in response to a message received from a remote user, the message having an address that corresponds to the assigned network address, routing the message from the global gateway to the local gateway means, and from the local gateway means to the wireless network for reception by the mobile communications unit having the assigned network address.

20. A method as set forth in claim 19 wherein the wired network operates in accordance with a protocol known as a Transmission Control Protocol, wherein the step of maintaining maintains network addresses that correspond to a protocol known as an Internet Protocol, and wherein the wireless network operates in accordance with a protocol other than the Transmission Control Protocol.

* * * * *